A. A. THIELE AND J. W. INGERSOL.
LEAD STACKING MACHINE.
APPLICATION FILED NOV. 8, 1919.

1,389,794.

Patented Sept. 6, 1921.
4 SHEETS—SHEET 1.

INVENTOR
Adolph A. Thiele
John W. Ingersol
BY
Albert M. Austin
ATTORNEY

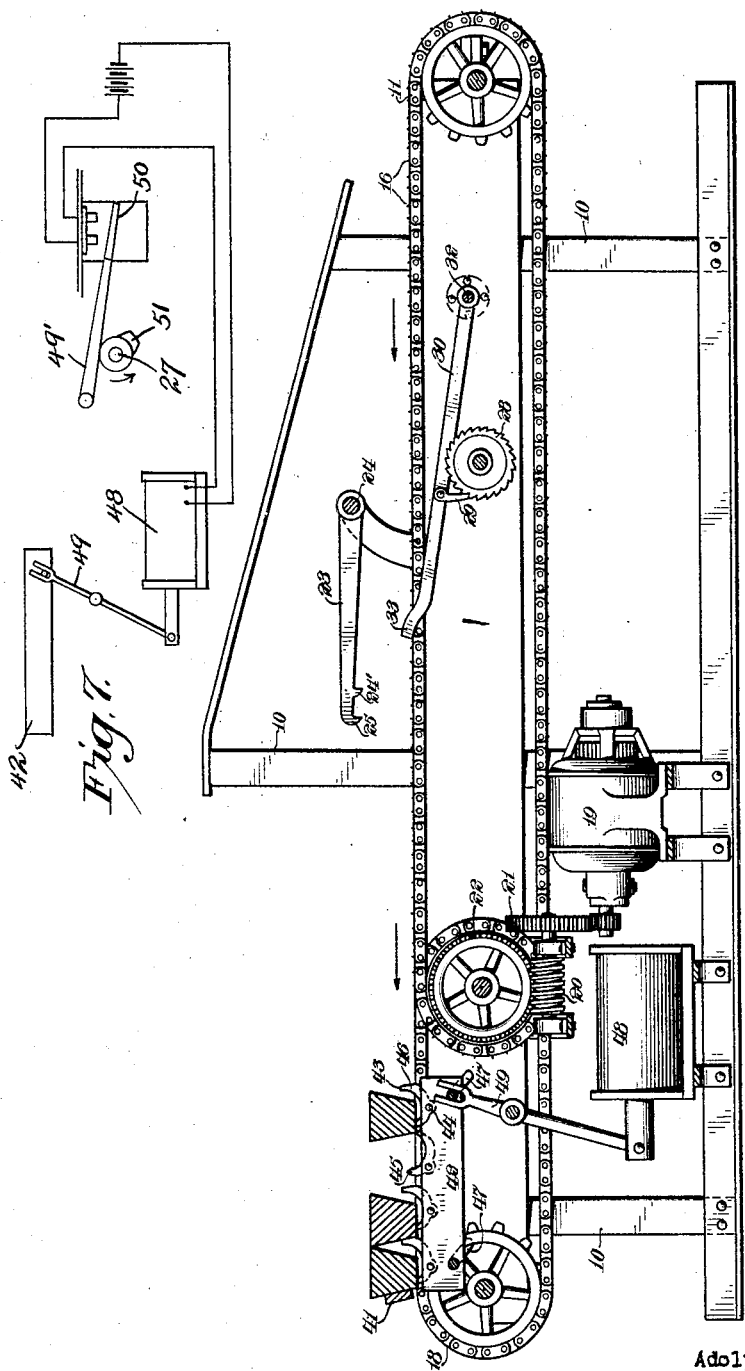

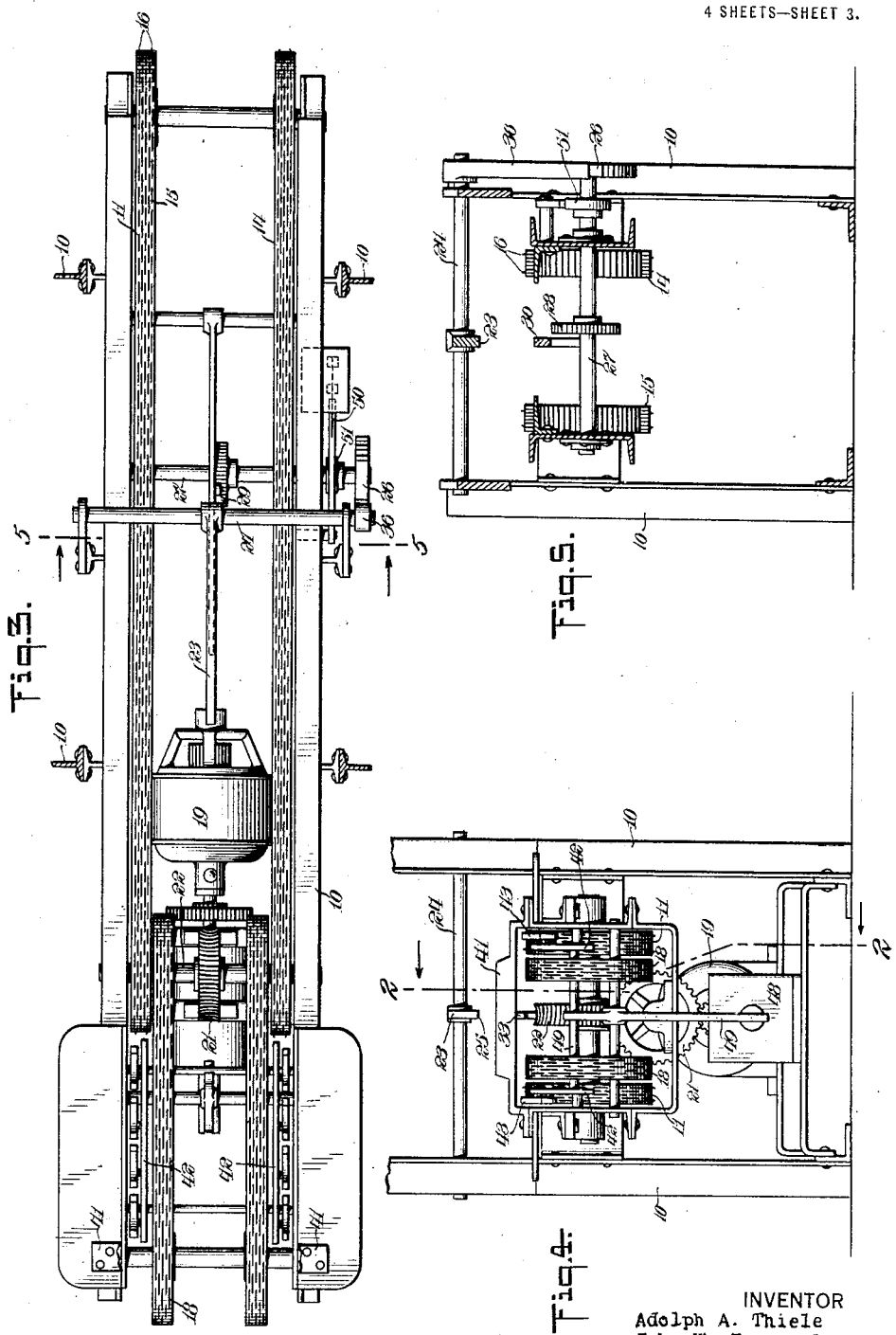

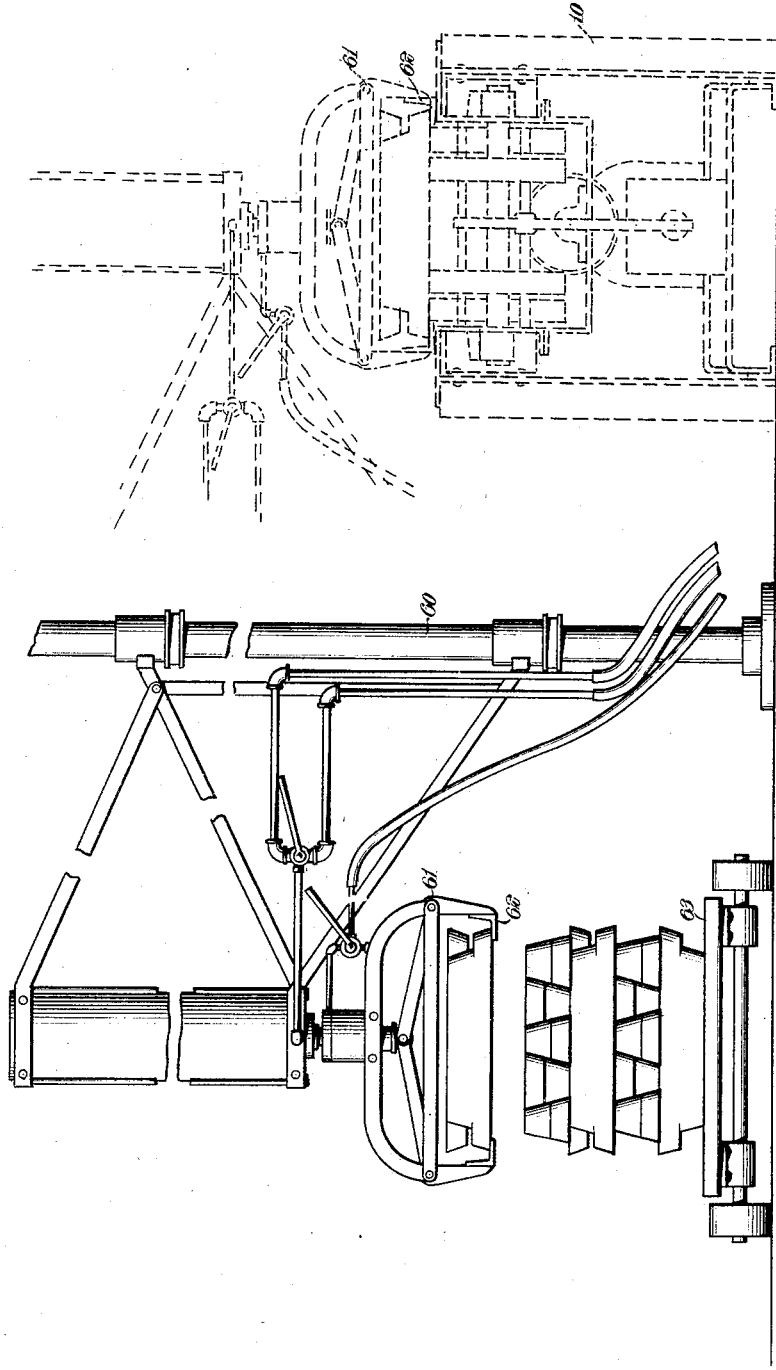

UNITED STATES PATENT OFFICE.

ADOLPH A. THIELE AND JOHN W. INGERSOL, OF OMAHA, NEBRASKA, ASSIGNORS TO AMERICAN SMELTING AND REFINING COMPANY, OF NEW YORK, N. Y., A CORPORATION OF NEW JERSEY.

LEAD-STACKING MACHINE.

1,389,794.     Specification of Letters Patent.     Patented Sept. 6, 1921.

Application filed November 8, 1919. Serial No. 336,641.

*To all whom it may concern:*

Be it known that we, ADOLPH A. THIELE and JOHN W. INGERSOL, citizens of the United States, and residents of Omaha, county of Douglas, and State of Nebraska, have invented certain new and useful Improvements in Lead-Stacking Machines, of which the following is a specification.

The invention relates in general to a machine for assembling blocks or bars, which are fed thereto in spaced apart relation, into a compactly positioned stack formed of a plurality of superposed tiers in which the units of each tier are arranged in compact formation. Specifically, the invention relates to a machine for use in a metallurgical plant and is especially designed for receiving the usual elongated frustum of a quadrangular pyramidal form of lead bars delivered from the molding machine, assembling the bars into compactly formed tires and positioning the tiers in a definite form of stack convenient for ready handling.

The primary object of the invention is to provide a simple form of machine of the type outlined which will handle these heavy bars rapidly, economically and with the precision of operation and with the accuracy in disposing the bars in a definite positioning that characterizes the mechanical handling of heavy members.

While the invention is of general application and the machine hereinafter selected as a physical embodiment of the invention has been particularly designed to handle a definite form of lead bar, it is to be understood that the invention is not limited to the use selected for illustration and that the machine illustrated may be used, with obvious mechanical modification, in any situation where the articles to be assembled or stacked can be handled by such a machine. The lead bar as usually molded are relatively long on their top face, hereinafter identified, as their bottom face for convenience in identifying the different faces of the bar in the tilting operation, hereinafter described. The bars have a form substantially that of an elongated frustum of a quadrangular pyramid with extensions from each end and in practice it has been found that they are most conveniently handled when disposed in units of six rows or tiers of five bars each. Preferably the first, or lower tier should be placed with each bar thereof top side up, and each of the other tiers are arranged in superimposed order and with the bars thereof alternately reversed in position so that the bars in each tier will contact or will at least be closely positioned along their adjacent inclined side faces.

One phase of the invention has for an object therefore a simple and commercially perfected form of machine for quickly, accurately, mechanically and automatically forming the stacks of bars in this preferred arrangement.

Another object of the invention incidental to the commercial perfection of the machine, is to provide a type of bar handling apparatus which can be actuated economically and which will necessitate the least possible handling of the units to be stacked.

Various other objects and advantages of the invention will be in part obvious from an inspection of the accompanying drawings and in part will be more fully set forth in the following particular description of one form of mechanism embodying our invention, and the invention also consists in certain new and novel features of construction and combination of parts hereinafter set forth and claimed.

In the accompanying drawings:

Fig. 2 is a vertical longitudinal section taken centrally through the device shown in Fig. 1, on the line 2—2 of Fig. 4 and looking in the direction indicated by the arrows;

Fig. 3 is a plan view looking down upon the device shown in the preceding figures with the grab hook element of the complete disclosure and the mold conveyer element removed;

Fig. 4 is a view in end elevation of the machine shown in the preceding figure looking at the same from the left end side of the figure;

Fig. 5 is a transverse sectional view taken on the line 5—5 of Fig. 3 looking in the direction indicated by the arrows;

Fig. 6 is an enlarged view of the grab hook device at the discharge end of the device shown in the preceding figures, showing in broken line outline the relation of the grab hook mechanism in the act of lifting the assembled bars, and showing, in full lines, the grab hook mechanism in the act of stacking the tiers on a truck, and;

Fig. 7 is a detailed showing of the finger actuating device at the left end of Fig. 1, together with the electrical connections.

Figure 1:
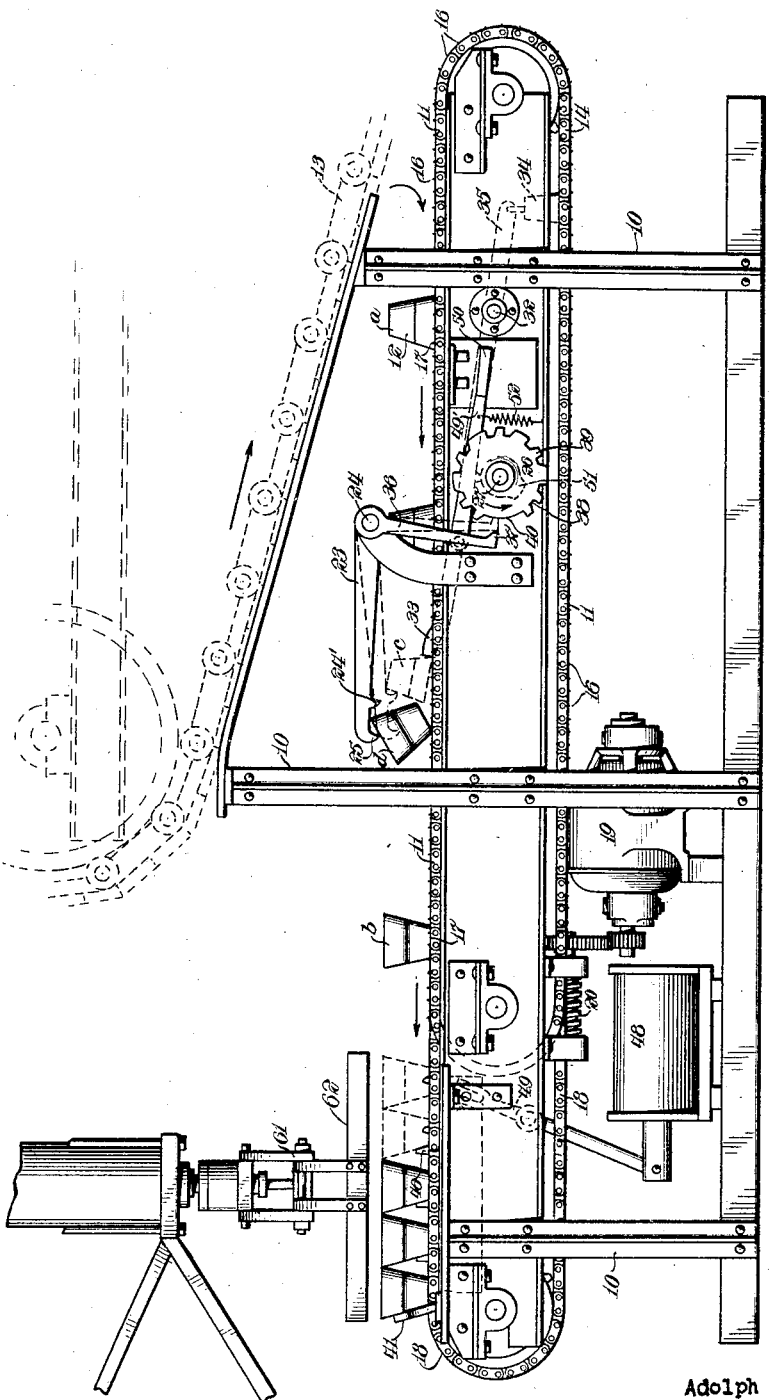
Figure 1 is a view in side elevation of a preferred embodiment of that portion of the invention which relates to the bar tripping and assembling features which embodiment is shown in operative relation to the conveyer of the molding machine shown symbolically in dash outline.

In the following description and in the claims, parts will be identified by specific names for convenience of expression but they are intended to be as generic in their application to similar parts as the art will permit.

Referring to the part of the complete disclosure shown in Figs. 1 to 5, there is disclosed a supporting steel frame-work 10, in which are mounted the different parts of the tripping and assembling mechanism. This mechanism includes a receiving conveyer 11 positioned to receive the bars 12 dropped from the overhanging conveyer belt 13 which diagrammatically represents part of the usual lead bar molding machine.

The bars are positioned on the conveyer 11 in spaced apart position, a distance of 14 inches, in one embodiment of the invention. The bars, as shown in the position indicated at $a$ in Fig. 1, are regarded in the trade as in an inverted position but for the purpose of facilitating the description of the bars in their treatment by the machine disclosed, it will be more convenient to consider that the bars at $a$ are in a normal, upright position. The conveyer 11 is formed of a pair of transversely spaced apart endless chains 14 and 15 each of which are provided with outwardly projecting, sharp points 16 which engage in the undersurface 17 of the soft lead and tend to hold the lower portion of the bars as they are being turned during the action of the tripping mechanism, hereinafter more fully described.

The receiving conveyer 11 discharges onto a relatively shorter, assembling or discharging conveyer 18 also formed of spaced apart endless chains. These assembling chains constitute, in effect, continuations of the chains forming the receiving conveyer and are positioned to the inside of and extend beyond said receiving conveyer chains, as shown more particularly in Fig. 3. The chains forming the discharging conveyer are not provided with points 16, so as to permit the chains to pass under the assembled bars. Both conveyers are driven in unison from an electric motor 19 through a worm drive gear set 20, the last gear 21 of which is fixed to a driving conveyer shaft 22 to which is also fixed the power driving wheels for each of the chains of the two conveyers.

It will be noted that all of the bars are fed to the receiving conveyer in upright position; further that in the desired stacking the first five bars forming the bottom tier are to be in inverted position and that each alternate bar of the other tiers are alternately in upright and inverted positions. It is therefore necessary to invert certain of the bars as they are passed to the tier forming and assembling operation on the discharging conveyer. For this purpose, the receiving conveyer is provided with a bar tripping mechanism, having a time control arranged to perform a cycle of tripping operations on the bars as they are passed along the receiving conveyer. By this means certain of the bars are inverted and others are permitted to pass uninverted so as to give the desired sequence of bar-arrangement requisite to form the desired stack. The tripping device includes a tripper arm 23 extending from a pivoted shaft 24 in the direction of movement of the bars on the conveyer and is positioned to extend over the bars. The tripper arm has two possible positions; in one position, shown in full lines in Fig. 1, the bars are free to pass beneath the arm without being tilted thereby and in the second or lowered position, shown in dash line in Fig. 1, the arm is lowered from its inoperative position and engages the bars to tilt the same into two succeeding positions thereby to invert the bars from the position shown at $a$ in Fig. 1 into the position shown at $b$ in the figure. The tripper arm is provided with two downwardly extending hooks 24' and 25, the first of which engages the upper, advanced edge of the bar to tilt the same through the position shown at $c$ in Fig. 1 and over an angle of approximately 90° until the bar is lying on one of its sides. While in this side position it is similarly engaged by the outermost hook 25 which acts thereon to move the bar through the position shown at $d$ and into the fully inverted position shown at $b$.

The movement of the tripper arm is controlled by a timing mechanism which includes a timer wheel 26 fixed to a timer shaft 27 extending transversely of the machine and positioned between the upper and lower reaches of the conveyer. Also fixed to this shaft is a one-way ratchet wheel 28 shown in side elevation in Fig. 2. The ratchet wheel illustrated is provided with thirty teeth, one for each of the bars which goes to make up the series of bars forming the completed stack. This ratchet constitutes part of a pawl-and-ratchet, step-by-step feed, the pawl 29 of which is mounted upon a ratchet actuated lever 30. One end of this lever, adjacent the receiving end of the conveyer, is pivoted to a supporting rod 32 pivotally mounted in the frame of the machine. The opposite end of the lever 30 constitutes an angularly disposed working end 33, extending in the direction of movement of the bars as they are moved along the conveyer. This end is positioned in the path of movement of the bars and inclined thereto so that, as each bar engages the end 33 it depresses the same a distance just sufficient to cause the ratchet wheel to be advanced one step, or, in the illustrated device, for one-thirtieth of a complete revolution. The actuating lever is restored to its elevated position to permit the pawl to take into engagement with the next tooth by means of a counterweight 34 hung to a rearward extension 35 from the shaft 32 as shown in Fig. 1.

A tripper arm actuating lever 36 is fixed to and depends from one end of the shaft 24 and is provided at its lower end with a rearwardly pointing nose 37 which engages the periphery of the timer wheel 26. The periphery of the timer wheel is provided with a series of recesses 38 and projections 39 disposed in such an order that when the nose 37 is in a recess the tripper arm is in its lowered position, as shown in the dash lines in Fig. 1, and when the nose is raised by any of the projections 39 the tripper arm is raised to its elevated position as shown in full lines in Fig. 1. The relatively long recess 40 of the timer wheel is for the purpose of causing the tripper arm to remain lowered for a period of time necessary to invert the first five bars forming the lowermost tier of the series. The following projections are disposed to invert each alternate bar as it is passed under the tripper arm as previously described.

Should it be desired to form the bars in some other arrangement than that suggested, it is obviously possible to provide for any other desired arrangement, simply by substituting a timer wheel with the necessary spacing of recesses and projections to effect the desired arrangement.

The bars arranged on the receiver conveyer in the desired order of upright and inverted positions are then passed onto the discharging conveyer where they are moved from their spaced apart position into a closely assembled position conveniently for lifting as a unit. A stop 41 is positioned at the far end of the discharging conveyer. It is to be understood that the first bar moves in contact with this top and is prevented from further movement. The other bars are moved successively into engagement with the stop or into engagement with the preceding stopped bar until a complete tier is formed, in this case when five bars have been assembled.

As the bars for forming the bottom tier of the stack are narrow in width at their bottom sides, means must be provided for maintaining the bottom of these bars in fixed position and thus defeat any tendency of the tier as a whole to buckle upwardly due to the action of the conveyer chains passing therebeneath. For this purpose a pair of spacing finger plates 42 is positioned one on the outside of each of the discharging conveyer belts. These plates are designed to be raised simultaneously into an operative position in a timed sequence to receive the inverted bars of the first tier. Each of the plates is provided with a set of four equally spaced apart upstanding U-shaped fingers 43. Each of the fingers is pivotally connected to its supporting plate 42 by means of a pivot pin 44. The pins are so disposed relative to the crotch of the finger that the advance side 45 of each finger is of less length from the pivot than the rear side 46. By this construction it is possible for the bars to move successively over each of the lowered sides 46 and contacting with the curved inner face of the far side 45 to act to lower the far side and thus to pass over each finger in succession until stopped either by the stop 41 or by the stopped bar in advance thereof as shown in the several succeeding positions of the bars in Fig. 2. It will be understood from this figure that a stopped bar will hold the advance side 45 of the finger in depressed position, thus elevating the rear side 46 which thus constitutes a stop for the bottom side of the next succeeding block engaging the same. This construction holds the top edges of the block in engagement and the bottom edges fixed in spaced apart position as shown more particularly in Fig. 1. When the bars forming the first tier are in position, the plates, together with their stop fingers, are moved into an inoperative position below the level of the upper reach of the conveyer chains so as to permit the succeeding bars to be assembled as hereinafter described. The plates 42 are each mounted for vertical movement in pin and slot guideways 47 and are moved to and from their elevated positions by means of a solenoid 48 acting thereon through an upstanding swinging lever connection 49. The solenoid is energized periodically in a timed sequence by the actuation of the timing mechanism and for this purpose the current supplied to the solenoid is controlled through the agency of a switch 49. The knife element 50 of the switch is held in engagement with a cam 51 fixed to the timer shaft and disposed with relation to the recess 40 in the timer wheel so that the solenoid will be energized and the stop plate elevated in time to receive the bars of the first tier as they are fed to the discharging conveyer. A spring 52 acts on the knife switch to maintain the same normally in circuit breaking position and in contact with the cam 51.

Each tier as it is formed is lifted from the discharging conveyer and positioned in superposed relation to form the desired stacks. For this purpose a vertically extending upright 60 is positioned adjacent the discharge end of the last conveyer and provides a pivotal support for a grab hook construction 61. This construction may be of any conventional form, the device selected for illustration being of the pneumatically actuated type. The grab hook construction includes a pair of bar-lifting, angled members 62 designed to engage under the ends of the bars forming each tier to elevate the same, to remove the tiers from the conveyer as shown in dash lines in Fig. 1 and to position the same in a truck 63 as shown in full lines in Fig. 6.

In operation and assuming that a continuous series of bars are being discharged in an assumed upright position onto the receiving conveyer, the first set of five bars are inverted as they pass under the tripper arm and are passed onto the discharging conveyer and assembled in close formation as hereinbefore described. The grab hook device is then rotated into position over the assembled bars, engage opposite ends of the tier, elevate and rotate the tiers and deposit the same on the truck with all of the bars of the lower tier in inverted position as shown in Fig. 6.

The bars to form the second set are advanced along the receiving conveyer with each alternate bar permitted to pass uninverted and the next bar inverted to form the tier of three uninverted and two inverted bars as shown in the second lowermost tier in Fig. 6. This second set of five bars are assembled in close position on the discharging conveyer and the grab hook device is again actuated to lift this second tier and to deposit the same on the first tier and with the bars of the second tier extending at right angles to the length of the bars in the first or lowermost tier.

This operation is repeated each succeeding tier of alternate upright and inverted bars being assembled and positioned on the stack with the bars extending at right angles to the bars of the tier next below. The operation is repeated until a stack of six tiers of five bars each or a total of thirty bars are assembled in the stack.

When the thirtieth bar of the first series has actuated the ratchet feed the timer wheel will have completed one cycle of revolution under the action of the step by step movement of the ratchet actuating lever and the machine is automatically restored to a position to repeat the cycle of operation to form another stack of thirty bars.

By means of a device of this character it is possible to receive the spaced apart and upright bars as they are discharged from the molding machine and to quickly and mechanically assemble the same into the desired stacking arrangement which has been found convenient for handling bars of this character.

Having thus described our invention, we claim:

1. In a bar stacking machine, the combination with a bar receiving conveyer and a bar discharging conveyer for receiving the bars discharged from the receiving conveyer, a stop at the discharging end of said discharging conveyer for limiting the movement of the bars thereon, power means operatively connected to both conveyers for driving the same in unison, means associated with the receiving conveyer for arranging the bars in a position different from the position which they possess when received on said receiving conveyer and means associated with the discharging conveyer for assembling certain of the bars in a set, in a desired position, with the first bar of the set engaging said stop.

2. In a bar stacking machine, the combination with a bar receiving conveyer adapted to receive a series of bars thereon in spaced apart upright position and a bar discharged from the receiving conveyer, a stop at the discharge end of said discharging conveyer for limiting the movement of the bars assembled thereon, means associated with the receiving conveyer for inverting a certain number of the bars of the series to form on the discharging conveyer a set of inverted bars and for alternately inverting every other succeeding following bar in the series while permitting the other bars to pass on to the discharging conveyer in the upright position in which they are fed to the receiving conveyer thereby to form a succeeding set of bars in which each alternate bar is reversed in position from the next succeeding or preceding bar in the set.

3. In a bar stacking machine, the combination with a bar receiving conveyer adapted to receive a series of bars thereon in spaced apart upright position and a bar discharged from the receiving conveyer, a stop at the discharge end of said discharging conveyer for limiting the movement of the bars assembled thereon, a tripping device for inverting the bars as they are carried along by the receiving conveyer, and a timing device operatively associated with the tripping device for periodically moving the same into an inoperative position to permit certain of the bars to pass to the receiving conveyer in the position in which they are placed on the receiving conveyer.

4. In a bar stacking machine, the combination of a conveyer adapted to receive a series of bars thereon in spaced apart, upright position, a tripping device for engaging certain of the bars to turn the same as they are passed along by the conveyer and a control for said device actuated by the successive engagement therewith of the bars on the moving conveyer.

5. In a bar stacking machine, the combination of a conveyer adapted to receive a series of bars thereon in spaced apart, upright position, a tripping device for engaging certain of the bars to turn the same as they are passed along by the conveyer and a control for said device actuated by the successive engagement therewith of the bars on the moving conveyer, said control provided with means for moving the tripping device to and from an operative position in a preset sequence thereby to turn certain of the bars while permitting others to move along without being turned.

6. In a bar stacking machine, the combination of a conveyer adapted to receive a series of bars thereon in spaced apart, upright position, a tripping device for engaging certain of the bars to turn the same as they are passed along by the conveyer and a control for said device actuated by the successive engagement therewith of the bars on the moving conveyer, said control provided with means for moving the tripping device to and from an operative position in a preset sequence thereby to turn certain of the bars while permitting others to move along without being turned and means at the discharge end of the receiving conveyer for assembling the turned and the unturned bars in a closely positioned set.

7. In a bar stacking machine, the combination of a conveyer adapted to receive a series of bars thereon in spaced apart upright position, a tripping device including a hooked tripping arm positioned above the conveyer and adapted to engage over the bars to over-turn the same as they are moved past the arm by the conveyer, a control for said arm including a timing device for regulating the sequence of movement of the tripping arm thereby to trip some of the bars while permitting others to pass untripped, and a pawl and ratchet feed actuated by the moving bars and connected to the timing device to actuate the same.

8. In a bar stacking machine, the combination of a conveyer adapted to receive a series of bars thereon in spaced apart upright position, a tripping device including a hooked tripping arm positioned above the conveyer and adapted to engage over the bars to over-turn the same as they are moved past the arm by the conveyer, and a control for said arm including a bar actuated member disposed in the path of movement of the bars as they are moved along the conveyer.

9. In a bar stacking machine, the combination of a conveyer adapted to receive a series of bars thereon in spaced apart position, said conveyer provided with projections adapted to engage the bottom of the bars and tending to hold the same during a turning operation, a tripping mechanism including a hooked arm positioned over the conveyer and adapted to engage edges at the upper sides of the bars to overturn the same on the conveyer as the bars are passed along.

10. In a bar stacking machine, the combination of a conveyer adapted to receive a series of bars thereon in spaced apart position, said conveyer provided with projections adapted to engage the bottom of the bars and tending to hold the same during a turning operation, a tripping mechanism including a hooked arm positioned over the conveyer and adapted to engage edges at the upper sides of the bars to overturn the same on the conveyer as the bars are passed along, said arm provided with a plurality of spaced apart hooks, each adapted to turn over each bar engaged thereby and said plurality of hooks turning over the bars engaged thereby more than once.

11. In a device for overturning objects fed therethrough, the combination of a conveyer, a tripping device including a tripping arm adapted to engage the objects to overturn the same, a timer shaft, a timer wheel actuated by said shaft, an arm in operative engagement with said timer wheel for actuating the tripping arm in a timed sequence controlled by the timer wheel, a pawl and ratchet feed for the timer shaft and a ratchet actuating lever operatively connected to the ratchet element of said feed for moving the timer wheel with a step-by-step movement, said lever having a part disposed in the path of movement of the objects on the conveyer whereby successive objects will each actuate the ratchet element one step of its movement.

12. In a device for overturning objects fed therethrough, the combination of a conveyer, a tripping device including a tripping arm adapted to engage the objects to overturn the same, and control means for the tripping device actuated by the objects moving along the conveyer for overturning certain of the objects in a timed sequence while permitting others to pass without being turned.

13. In a device for overturning objects fed therethrough, the combination of a conveyer, a tripping device including a tripping arm adapted to engage the objects to overturn the same, and control means for the tripping device actuated by the objects moving along the conveyer for overturning certain of the objects in a timed sequence while permitting others to pass without being turned, said means including a replaceable timing element whereby the sequence of turned to not-turned objects is varied.

14. In a device of the class described, the combination of a bar feeding device, for moving a series of spaced apart bars forming two sets towards a stacking position, means for assembling the bars of the first set of the series in a closely positioned tier with each bar inverted, said means including mechanism for assembling the bars of the succeeding set in a closely positioned tier with each alternate bar in an inverted position.

15. In a device of the class described, the combination of a bar feeding device, for moving a series of spaced apart bars forming two sets toward a stacking position, means for assembling the bars of the first set of the series in a closely positioned tier with each bar inverted, said means including mechanism for assembling the bars of the succeeding set in a closely positioned tier with each alternate bar in an inverted position, and means for periodically removing from the feeding device each set as it is assembled.

16. A bar stacking machine including a conveyer for receiving a series of spaced apart bars disposed in upright position, time controlled means coacting with the conveyer for forming a closely positioned tier of the bars in inverted position and then forming a close positioned tier of the bars with each alternate bar reversed in position.

This specification signed this 15th day of September, 1919.

ADOLPH A. THIELE.

This specification signed this 20th day of October, 1919.

JOHN W. INGERSOL.